US012764666B2

(12) United States Patent
Zuo et al.

(10) Patent No.: US 12,764,666 B2
(45) Date of Patent: Oct. 13, 2026

(54) COMMUNICATION METHOD AND COMMUNICATIONS APPARATUS

(71) Applicant: GUANGDONG OPPO MOBILE TELECOMMUNICATIONS CORP., LTD., Dongguan (CN)

(72) Inventors: Zhisong Zuo, Dongguan (CN); Weijie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 211 days.

(21) Appl. No.: 18/887,971

(22) Filed: Sep. 17, 2024

(65) Prior Publication Data

US 2025/0016685 A1 Jan. 9, 2025

Related U.S. Application Data

(63) Continuation of application No. PCT/CN2022/081532, filed on Mar. 17, 2022.

(51) Int. Cl.
*H04W 52/02* (2009.01)
*H04L 1/00* (2006.01)

(52) U.S. Cl.
CPC ....... *H04W 52/0261* (2013.01); *H04L 1/0061* (2013.01)

(58) Field of Classification Search
CPC ... H04W 52/0261; H04W 4/80; H04W 52/02; H04L 1/0061
See application file for complete search history.

(56) References Cited

U.S. PATENT DOCUMENTS

2018/0331865 A1* 11/2018 Ziv ......................... H04L 27/12
2021/0368439 A1* 11/2021 Karimaruthumkal ........................ H04L 5/0055

FOREIGN PATENT DOCUMENTS

| | | | |
|---|---|---|---|
| CN | 111246493 | A | 6/2020 |
| CN | 113067937 | A | 7/2021 |
| CN | 113573409 | A | 10/2021 |
| TW | 201633211 | A | 9/2016 |

OTHER PUBLICATIONS

PCT International Search Report for International Application No. PCT/CN2022/081532 dated Dec. 7, 2022.
PCT Written opinion for International Application No. PCT/CN2022/081532 dated Dec. 7, 2022.

* cited by examiner

*Primary Examiner* — Ankur Jain
(74) *Attorney, Agent, or Firm* — Quarles & Brady LLP

(57) ABSTRACT

Disclosed are a communication method and a communications apparatus. The method includes: receiving, by a terminal device, a first downlink signal from a first device, where the terminal device is a zero-power terminal; and sending, by the terminal device, a first uplink signal to a second device according to the first downlink signal.

18 Claims, 6 Drawing Sheets

COMMUNICATION METHOD AND COMMUNICATIONS APPARATUS

CROSS-REFERENCE TO RELATED APPLICATIONS

This application is a continuation of International Application No. PCT/CN2022/081532, filed on Mar. 17, 2022, the disclosure of which is hereby incorporated by reference in its entirety.

TECHNICAL FIELD

This application relates to the field of communication technologies, and more specifically, to a communication method and a communications apparatus.

BACKGROUND

With development of communication technologies, a zero-power terminal is put into use in some communications systems, and the zero-power terminal has features such as low power consumption and a low cost. However, because design of the zero-power terminal is relatively simple, another problem may be introduced in a process of using the zero-power terminal.

SUMMARY

This application provides a communication method and a communications apparatus.

According to a first aspect, a communication method is provided, and includes: receiving, by a terminal device, a first downlink signal from a first device, where the terminal device is a zero-power terminal; and sending, by the terminal device, a first uplink signal to a second device according to the first downlink signal.

According to a second aspect, a communication method is provided, and includes: sending, by a first device, a first downlink signal to a terminal device, where the terminal device is a zero-power terminal, and the first downlink signal is used to trigger the terminal device to send an uplink signal to a second device.

According to a third aspect, a communication method is provided, and includes: receiving, by a second device, a first uplink signal sent by a terminal device upon triggering of a first downlink signal, where the first downlink signal is from a first device, and the terminal device is a zero-power terminal.

According to a fourth aspect, a communications apparatus is provided, and includes: a receiving unit, configured to receive a first downlink signal from a first device, where the apparatus is a zero-power terminal; and a sending unit, configured to send a first uplink signal to a second device according to the first downlink signal.

According to a fifth aspect, a communications apparatus is provided, and includes: a sending unit, configured to send a first downlink signal to a terminal device, where the terminal device is a zero-power terminal, and the first downlink signal is used to trigger the terminal device to send an uplink signal to a second device.

According to a sixth aspect, a communications apparatus is provided, and includes: a receiving unit, configured to receive a first uplink signal sent by a terminal device upon triggering of a first downlink signal, where the first downlink signal is from a first device, and the terminal device is a zero-power terminal.

According to a seventh aspect, a communications apparatus is provided, and includes a memory, a transceiver, and a processor, where the memory is configured to store a program, the processor performs data sending and receiving by using the transceiver, and the processor is configured to invoke the program in the memory to execute a method according to any one of the first aspect, the second aspect, or the third aspect.

According to an eighth aspect, a communications apparatus is provided, and includes a processor, configured to invoke a program from a memory to execute a method according to any one of the first aspect, the second aspect, or the third aspect.

According to a ninth aspect, a chip is provided, and includes a processor, configured to invoke a program from a memory to cause a device installed with the chip to execute a method according to any one of the first aspect, the second aspect, or the third aspect.

According to a tenth aspect, a computer-readable storage medium is provided, where a program is stored on the computer-readable storage medium, and the program causes a computer to execute a method according to any one of the first aspect, the second aspect, or the third aspect.

According to an eleventh aspect, a computer program product is provided, and includes a program, where the program causes a computer to execute a method according to any one of the first aspect, the second aspect, or the third aspect.

According to a twelfth aspect, a computer program is provided, where the computer program causes a computer to execute a method according to any one of the first aspect, the second aspect, or the third aspect.

DESCRIPTION OF EMBODIMENTS

The following describes the technical solutions in this application with reference to the accompanying drawings.

Figure 1:
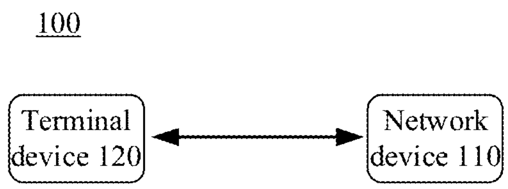
FIG. 1 is an example diagram of a wireless communications system according to an embodiment of this application.

FIG. 1 shows a wireless communications system 100 according to an embodiment of this application. The wireless communications system 100 may include a network device 110 and a terminal device 120. The network device 110 may communicate with the terminal device 120. The network device 110 may provide communication coverage for a specific geographic area, and may communicate with a terminal device 120 within the coverage area. The terminal device 120 may access a network (for example, a wireless network) through the network device 110.

FIG. 1 exemplarily shows one network device and one terminal device. Optionally, the wireless communications system 100 may include a plurality of network devices, and another quantity of terminal devices may be included in a coverage range of each network device. This is not limited in embodiments of this application. Optionally, the wireless communications system 100 may further include another network entity such as a network controller or a mobility management entity, which is not limited in embodiments of this application.

It should be understood that the technical solutions of embodiments of this application may be applied to various communications systems, such as a 5th generation (5G) system or new radio (NR), a long-term evolution (LTE) system, an LTE frequency division duplex (FDD) system, and LTE time division duplex (TDD). The technical solutions provided in this application may further be applied to a future communications system, such as a 6th generation mobile communications system or a satellite communications system. The technical solutions provided in this application may further be applied to another communications system, for example, a wireless fidelity (Wi-Fi) system, a vehicle-to-everything (V2X) system, an internet of things (IoT) system, or a local area network.

A terminal device in embodiments of this application may also be referred to as a user equipment (UE), an access terminal, a subscriber unit, a subscriber station, a mobile site, a mobile station (MS), a mobile terminal (MT), a remote station, a remote terminal, a mobile device, a user terminal, a terminal, a wireless communications device, a user agent, or a user apparatus. The terminal device in embodiments of this application may refer to a device providing a user with voice and/or data connectivity and capable of connecting people, objects, and machines, such as a handheld device or in-vehicle device having a wireless connection function. A terminal device in embodiments of this application may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, or the like. All terminal devices in embodiments of this application may be zero-power terminals.

A zero-power terminal may be classified into a passive terminal and an active terminal. For example, the zero-power terminal may be a device or a chip that does not need a built-in power supply, such as an electronic tag or a zero-power chip. Alternatively, the zero-power terminal may be a zero-power circuit in a device such as a mobile phone, or a circuit or a device that requires power supply such as a device including a zero-power circuit.

In embodiments of this application, a terminal device may be a terminal device applied to an internet of things. For example, the terminal device may be a warehouse device in a logistics station or a warehouse or a communications apparatus disposed in the warehouse device; or the terminal device may be an industrial sensor applied to industrial production or a communications apparatus disposed in the industrial sensor; or the terminal device may be a smart home appliance applied to smart home or a communications apparatus disposed in the smart home appliance.

Optionally, the terminal device may be configured to serve as a base station. For example, the terminal device may serve as a scheduling entity that provides a sidelink signal between terminal devices in a V2X system, a device-to-device (D2D) system, or the like. For example, a cellular phone and a vehicle communicate with each other by using a sidelink signal. A cellular phone and a smart home device communicate with each other without needing to relay communication signals through a base station.

A network device in embodiments of this application may be a device for communicating with a terminal device. The network device may also be referred to as an access network device or a radio access network device. For example, the network device may be a base station. The network device in embodiments of this application may refer to a radio access network (RAN) node (or device) that connects the terminal device to a wireless network. The base station may broadly cover various names in the following, or may be replaced with the following names: a NodeB (NodeB), an evolved NodeB (eNB), a next generation NodeB (gNB), a relay station, an access point, a transmitting and receiving point (TRP), a transmitting point (TP), a primary MeNB, a secondary SeNB, a multi-standard radio (MSR) node, a home base station, a network controller, an access node, a wireless node, an access point (AP), a transmission node, a transceiver node, a baseband unit (BBU), a remote radio unit (RRU), an active antenna unit (AAU), a remote radio head (RRH), a central unit (CU), a distributed unit (DU), a positioning node, or the like. The base station may be a macro base station, a micro base station, a relay node, a donor node, or the like, or a combination thereof. The network device in embodiments of this application may also be a node (for example, a control node) in another communications system. For example, the network device may be a control node in a Wi-Fi system, a V2X system, an IoT system, or a local area network.

In some embodiments, the network device may be fixed or mobile. For example, a helicopter or an unmanned aerial vehicle may be configured to serve as a mobile network device, and one or more cells may move depending on a location of the mobile network device. In other examples, a helicopter or an unmanned aerial vehicle may be configured to function as a device that communicates with another network device. In some embodiments, the network device may refer to a CU or a DU, or the network device may include a CU and a DU, or the network device may further include an AAU.

It should be understood that the network device may be deployed on land, including being indoors or outdoors, handheld, or in-vehicle or may be deployed on a water surface, or may be deployed on a plane, a balloon, or a satellite in the air. In embodiments of this application, the network device and a scenario in which the network device is located in embodiments of this application are not limited.

It should also be understood that all or some of functions of the network device and the terminal device in this application may also be implemented by software functions running on hardware, or by virtualization functions instantiated on a platform (for example, a cloud platform).

As mentioned above, a zero-power terminal may be a passive device or a low-power device. Therefore, a communication principle of the zero-power terminal is different from that of a common active terminal device. With reference to FIG. 2 to FIG. 5, the following exemplarily describes a working principle of a zero-power terminal by using a radio frequency identification (RFID) tag as an example.

An RFID tag is a typical zero-power terminal that may implement automatic transmission and identification of tag information in a contactless manner by using wireless coupling (including short-range inductive coupling and long-range electromagnetic coupling) at a transceiver end. The RFID tag is also referred to as a "radio frequency tag" or an "electronic tag". RFID tags may be classified into active electronic tags, passive electronic tags, and semi-passive electronic tags according to different power supply modes. An active electronic tag, also referred to as a proactive electronic tag, refers to that energy provided for working by a built-in battery of the electronic tag is different from an activation manner of a passive radio frequency. The active electronic tag may proactively send information at a specified frequency band. A passive electronic tag, also referred to as a batteryless electronic tag, does not support a built-in battery. When the passive electronic tag moves close to a reader/writer, an electronic tag antenna in a near field range formed through antenna radiation of the reader/writer generates an induced current through electromagnetic induction. The induced current drives a chip circuit of the electronic tag, and the chip circuit sends identity information stored in the tag to the reader/writer through the electronic tag antenna. A semi-active electronic tag inherits advantages of the passive electronic tag, such as a small volume, a light weight, a low price, and a long service life. When no reader/writer performs access, a built-in battery supplies power to only a few circuits in a chip. The built-in battery supplies power to an RFID chip only when a reader/writer performs access, to increase a read/write distance of the tag and improve communication reliability.

Figure 2:
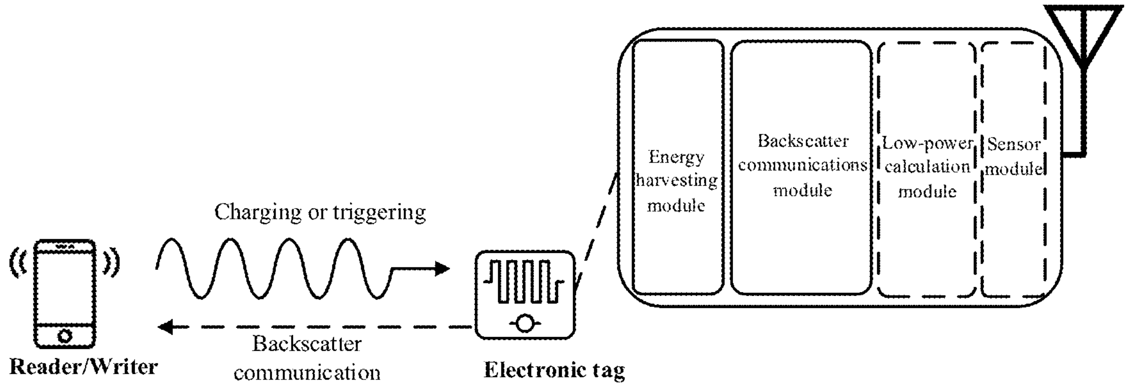
FIG. 2 is an example diagram of zero-power communication according to an embodiment of this application.

As shown in FIG. 2, an RFID system may include two parts: an electronic tag (TAG) and a reader/writer. The electronic tag includes a coupling component and a chip. Each electronic tag has a unique electronic code, which is placed on a to-be-tested target to mark the target object. The reader/writer can not only read information on the electronic tag, but also write the information on the electronic tag, and provide the electronic tag with energy required for communication. As shown in FIG. 2, after entering an electromagnetic field, an electronic tag receives a radio frequency signal (used for charging or triggering) sent by a reader/writer. A passive electronic tag or a batteryless electronic tag transfers information stored in the electronic tag by using energy obtained from an electromagnetic field generated in space, and the reader/writer reads and decodes the information to identify the electronic tag.

Communication based on a zero-power terminal may be referred to as zero-power communication for short. RFID is a type of zero-power communication, which includes energy harvesting, backscatter communication, and low-power calculation. As shown in FIG. 2, a typical zero-power communications system includes the reader/writer and the zero-power terminal (for example, an electronic tag). The reader/writer emits a radio wave, which is used to provide energy for the zero-power terminal. An energy harvesting module installed in the zero-power terminal may harvest energy carried by a radio wave in space (FIG. 2 shows a radio wave emitted by the reader/writer), and is configured to drive a low-power calculation module of the zero-power terminal and implement backscatter communication. After obtaining the energy, the zero-power terminal may receive a control command of the reader/writer and send data to the reader/writer based on control command in a backscatter manner. The sent data may be from data stored in the zero-power terminal (for example, an identification or pre-written information, such as a production date, a brand, or a manufacturer of a commodity). The zero-power terminal may also be loaded with various sensors, to report, based on a zero-power mechanism, data collected by the various sensors.

The zero-power terminal device may support functions such as backscatter communication (back scattering), energy harvesting (RF power harvesting), load modulation, and encoding.

Figure 3:
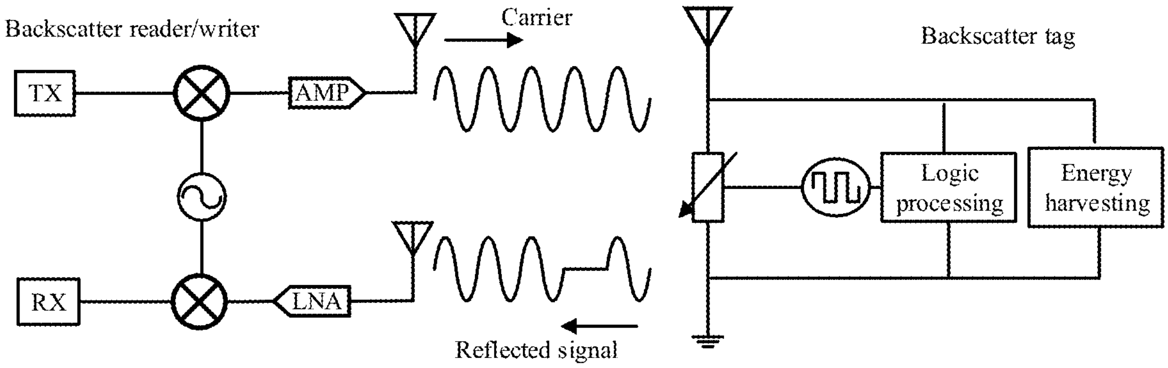
FIG. 3 is an example diagram of backscatter communication according to an embodiment of this application.
Figure 4:
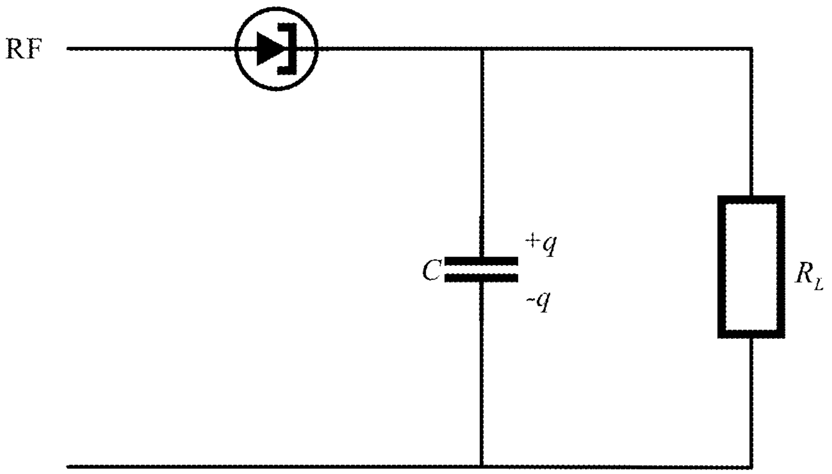
FIG. 4 is an example diagram of energy harvesting according to an embodiment of this application.
Figure 5:
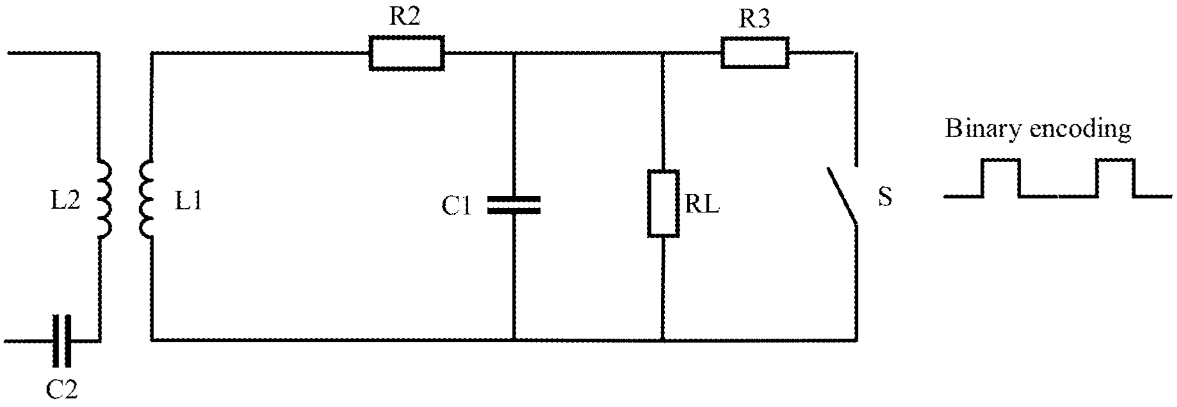
FIG. 5 is an example diagram of load resistance modulation according to an embodiment of this application.

1. Backscatter communication: As shown in FIG. 3, a zero-power device (a backscatter tag in the figure) receives a carrier signal sent by a backscatter reader/writer, and harvests energy through a radio frequency (RF) energy harvesting module. Further, the zero-power device provides energy for a low-power processing module (that is, a logic processing module in FIG. 3), modulates an incoming signal, and performs backscatter. In a backscatter communication process, the zero-power terminal does not proactively emit a signal, but implements backscatter communication by modulating an incoming signal. The zero-power terminal does not rely on a conventional active power amplifier transmitter, but uses a low-power calculation unit, which greatly reduces hardware complexity.
2. Energy harvesting: A zero-power terminal may implement battery-free communication through energy harvesting. For example, the zero-power terminal may harvest energy of a spatial electromagnetic wave through electromagnetic induction by using an RF energy harvesting module, to drive a load circuit (low-power operation, a sensor, or the like), thereby implementing battery-free communication. A circuit of the RF energy harvesting module may be shown in FIG. 4.
3. Load modulation: Load modulation is a method generally used by an electronic tag to transmit data to a reader/writer. In load modulation, an electrical parameter of an electronic tag oscillator circuit is adjusted according to a beat of a data flow, so that a magnitude and a phase of electronic tag impedance change accordingly, thereby completing a modulation process. Load modulation technologies mainly include load resistance modulation and load capacitance modulation. In load resistance modulation, a load is connected in parallel to a resistor, which is referred to as a load modulation resistor. The resistor is switched on and off according to a clock of a data flow, and an on/off state of a switch S is controlled by binary data encoding. FIG. 5 is a diagram of a circuit principle of load resistance modulation. Similarly, in load capacitance modulation, a load may be connected in parallel to a capacitor, to replace a load modulation resistor controlled by binary data encoding in FIG. 5.
4. Encoding: Data transmitted by an electronic tag may be represented by different forms of code as binary bits "1" and "0". An RFID system generally uses one of the following encoding methods: non-return-to-zero inverted (NRZI) encoding, Manchester encoding, unipolar return-to-zero (Unipolar RZ) encoding, differential bi-phase (DBP) encoding, Miller encoding, or differential encoding. Generally, 0 and 1 are represented by using different pulse signals.

With rapid development of communication technologies, types and application scenarios of terminal devices keep increasing, and higher requirements are also imposed on prices and power consumption of the terminal devices. Zero-power terminal devices are introduced into some communications systems, to reduce power consumption and costs of terminal devices. For example, a zero-power terminal device may support backscatter communication (back scattering) and energy harvesting (RF power harvesting). Backscatter communication may refer to that the zero-power terminal device does not proactively emit a signal by using a conventional active power amplifier transmitter, but modulates a received carrier signal to backscatter a signal (that is, reflect a signal). Energy harvesting may refer to that the zero-power terminal device harvests energy of a spatial electromagnetic wave through electromagnetic induction by using a radio frequency (RF) module and drives a load circuit (of the zero-power terminal device) by using the harvested energy, so that the terminal device may operate in a battery-free state or a low-power state.

However, in some communications systems, interference is generated during communication of a zero-power terminal device. The wireless communications system 100 in FIG. 1 is used as an example. It is assumed that the terminal device 120 is a zero-power terminal device. In a TDD mode, when the network device 110 sends a downlink signal to the terminal device 120, a length of the downlink signal is generally in milliseconds, and a time for the terminal device 120 to reflect a signal may be only in nanoseconds. Therefore, the following case may occur: transmission of the downlink signal sent by the network device 110 may not be completed yet, and the reflected signal transmitted by the terminal device 120 has already been reflected to the network device 110. In this case, the reflected signal may cause interference to the downlink signal. In an FDD mode, because a frequency of the reflected signal is the same as that of the downlink signal, the reflected signal may also cause interference to the downlink signal. In addition, because power consumption of the zero-power terminal is relatively low, generally a communication distance of the zero-power terminal is relatively short.

Figure 6:
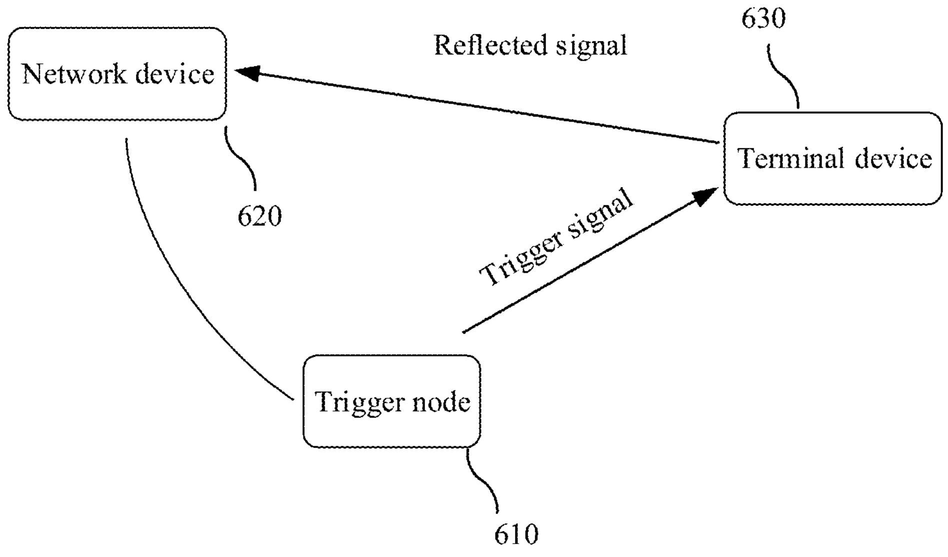
FIG. 6 is an example diagram of a wireless communications system to which an embodiment of this application is applicable.

To resolve one or more of the foregoing technical problems, this application proposes a communication method and a communications apparatus. A downlink signal (the downlink signal may include an energy supply signal and a trigger signal) is sent to a terminal device by using a dedicated trigger node (deployed separately from a network device). This may avoid overlapping between a transmission path of the downlink signal and a transmission path of a reflected signal, thereby avoiding interference between the reflected signal and the downlink signal. With reference to FIG. 6, the following describes an application scenario of an embodiment of this application.

FIG. 6 is an example diagram of a wireless communications system to which an embodiment of this application is applicable. The system 600 shown in FIG. 6 may include a trigger node 610, a network device 620, and a terminal device 630.

The trigger node 610 is deployed separately from the network device 620, and the trigger node 610 may be configured to send a downlink signal (for example, a trigger signal) to the terminal device 630. The network device 620 may be configured to receive a reflected uplink signal from the terminal device 630. The terminal device 630 may be a zero-power terminal device, and the terminal device 630 may receive an energy supply signal, harvest energy based on the energy supply signal, receive a trigger signal, and reflect an uplink signal to the network device 620. The energy supply signal may be sent by the trigger node 610 to the terminal device 630; or the energy supply signal may be sent by the network device 620 to the terminal device 630; or the energy supply signal may be sent by another device to the terminal device 630, which is not limited in embodiments of this application.

In this way, the terminal device may respectively transmit a downlink signal and an uplink signal with different devices, so that overlapping between a transmission path of the downlink signal and a transmission path of the uplink signal may be avoided, and interference between the downlink signal and the uplink signal can be avoided. Further, that the trigger node sends the downlink signal to the terminal device is equivalent to that the trigger node functions as a relay node between the network device and the terminal device, thereby increasing a transmission distance between the network device and the terminal device.

The trigger node 610 may directly communicate with the network device 620 through a wired link or a wireless link. The network device 620 may configure identity information of the trigger node 610 through the wired link or the wireless link. The network device 620 may send indication information to the trigger node 610, to control the trigger node 610 to send a trigger signal (or an energy supply signal) to the terminal device 630.

The network device 620 may control one or more trigger nodes 610, and establish a connection to the one or more trigger nodes 610. Correspondingly, each of the one or more trigger nodes 610 may send a trigger signal to one or more terminal devices 630.

Figure 7:
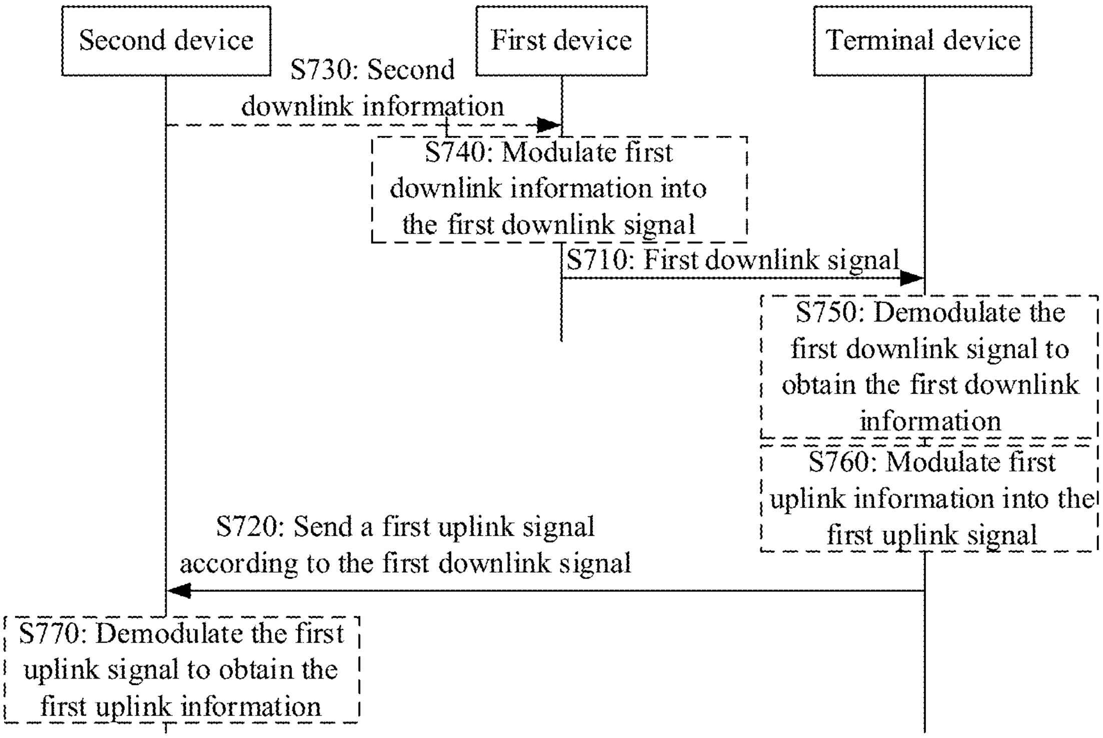
FIG. 7 is a schematic flowchart of a communication method according to an embodiment of this application.

With reference to FIG. 7, the following describes an embodiment of this application in detail by using examples.

FIG. 7 is a schematic flowchart of a communication method according to an embodiment of this application. The method 700 shown in FIG. 7 may include steps S710 and S720. Details are as follows.

S710: A first device sends a first downlink signal to a terminal device.

The terminal device may be a zero-power terminal device. Optionally, the terminal device may be the terminal device 630 shown in FIG. 6. For example, the terminal device may support backscatter communication and energy harvesting.

Optionally, the first device may be the trigger node 610 shown in FIG. 6. Optionally, the first device may further send an energy supply signal to the terminal device.

The first downlink signal may provide energy for the terminal device. Optionally, the first downlink signal may be an energy supply signal. For example, the terminal device may harvest energy through the first downlink signal, and supply power to the terminal device by using the harvested energy.

The first device may send a downlink signal to a plurality of terminal devices, and the foregoing terminal device (that is, the terminal device in S710) may be one of the plurality of terminal devices.

Before S710, the method 700 may further include step S730. Details are as follows.

S730: A second device may send second downlink information. Correspondingly, the first device may receive the second downlink information.

The second downlink information may be used to instruct the first device to send the first downlink signal to the terminal device.

Optionally, the first device may send the first downlink signal to the terminal device according to the second downlink information. It may be learned that the second device may control, based on the second downlink information, the first device to send a downlink signal to the terminal device.

The second device may be deployed separately from the first device, to avoid overlapping between a transmission path of a downlink signal (received by the terminal device) and a transmission path of an uplink signal (sent by the terminal device), thereby avoiding interference between the downlink signal and the uplink signal. Optionally, the second device may communicate with the first device through a wired link or a wireless link. Optionally, the second device may be the network device 620 shown in FIG. 6. For example, the second device may only be configured to receive an uplink signal (for example, a first uplink signal) reflected by the terminal device, but may not send a downlink signal to the terminal device (for example, the first device sends a downlink signal to the terminal device). Optionally, the second device may further send an energy supply signal to the terminal device.

Optionally, the second device may configure identity information of the first device. For example, the second device may send third downlink information to the first device, and the third downlink information may be used to configure an identity of the first device.

Optionally, the first downlink signal may carry first downlink information, and the first downlink information may be used to trigger the terminal device to send an uplink signal. For example, the first downlink information may include the identity information of the first device; or the first downlink information may further include downlink data information; or the first downlink information may further include uplink data request information, and the uplink data request information may be used to request the terminal device to send uplink data information.

Before S710, the method 700 may further include step S740. Details are as follows.

S740: The first device may modulate the first downlink information into the first downlink signal.

Figure 8:
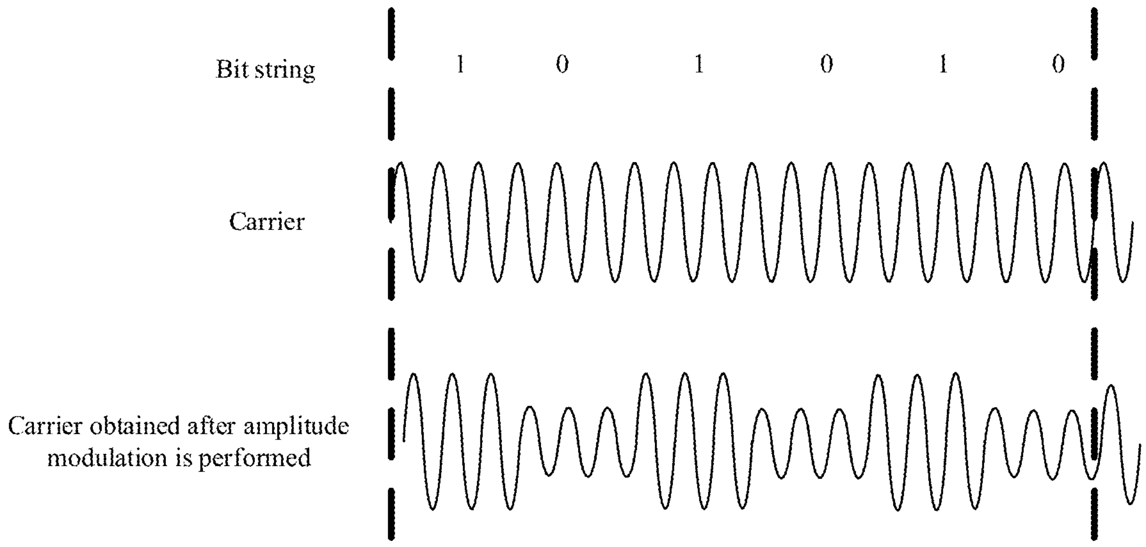
FIG. 8 is a schematic diagram of a modulation scheme according to an embodiment of this application.

Optionally, the first device may modulate the first downlink information into the first downlink signal in one or more manners of amplitude modulation, frequency modulation, or phase modulation. Amplitude modulation may refer to directly performing encoding by using a high electrical level or a low electrical level. For example, as shown in FIG. 8, for binary bit strings, amplitude modulation may use different amplitude values to represent “1” and “0” of the bit string by adjusting an amplitude value of a carrier. Similarly, frequency modulation may modulate a carrier by adjusting a frequency value of the carrier, and phase modulation may modulate a carrier by adjusting a phase value of the carrier.

Optionally, the first device may carry the first downlink information in the first downlink signal through cyclic redundancy check (CRC). For example, the first device may scramble the first downlink information into the first downlink signal by performing bitwise exclusive OR (or may also be other operation) on the first downlink information and the first downlink signal.

Optionally, the first device may carry the first downlink information in the first downlink signal through a preamble. For example, the first device may determine the first downlink information as a preamble of the first downlink signal, and a preset time interval is maintained between the first downlink information and the first downlink signal. Correspondingly, after receiving the preamble (that is, the first downlink information), the terminal device may determine that the preamble is the first downlink information if the terminal device receives the first downlink signal within the preset time interval.

Correspondingly, after S710, the method 700 may further include step S750. Details are as follows.

S750: The terminal device may demodulate the first downlink signal to obtain the first downlink information.

Optionally, the terminal device may demodulate the first downlink signal to obtain the first downlink information in one or more manners of amplitude modulation, frequency modulation, or phase modulation.

Optionally, the terminal device may demodulate the first downlink signal to obtain the first downlink information through cyclic redundancy check (CRC) demodulation.

Optionally, the terminal device may demodulate the first downlink signal to obtain the first downlink information through preamble demodulation.

In this embodiment of this application, the terminal device may further receive an energy supply signal. The terminal device may harvest energy based on the energy supply signal, to provide electrical energy for a load circuit in the terminal device. The energy supply signal may be sent by the first device to the terminal device; or the energy supply signal may be sent by the second device to the terminal device; or the energy supply signal may be sent by another device to the terminal device, which is not limited in embodiments of this application.

Optionally, the energy supply signal and the first downlink signal may be a same signal.

S720: The terminal device sends a first uplink signal according to the first downlink signal. Correspondingly, the second device may receive the first uplink signal.

The first uplink signal may refer to a reflected signal sent by the terminal device to the second device based on the first downlink signal through backscatter communication.

Optionally, a frequency band of the first uplink signal may be the same as a frequency band of the first downlink signal. In this way, when performing uplink and downlink transmission, the terminal device uses a same uplink and downlink frequency, and therefore may effectively use an uplink and downlink spectrum resource. Optionally, the frequency band of the first uplink signal may be different from the frequency band of the first downlink signal.

The first uplink signal may carry first uplink information.

Optionally, the first uplink information may include registration request information and/or uplink data information of the terminal device. For example, in a case in which the first downlink information includes the identity information of the first device, the first downlink information may be used to request the terminal device to send the registration request information to the second device, so that the second device identifies the terminal device.

In a case in which the first downlink information includes the identity information of the first device, the first downlink information may also be used to request the terminal device to send uplink data information to the second device.

For example, in a warehousing scenario, information about an associated commodity may be preset in the terminal device, for example, information such as a name, a type, dimensions, or a weight of the commodity. Uplink data request information may be used to instruct the terminal device to upload one or more pieces of the information about the commodity.

For another example, in a scientific research scenario or an industrial production scenario, the terminal device may be associated with a plurality of sensors, and information about these sensors may be preset in the terminal device, such as a type of a device associated with a temperature sensor or a running status of a device associated with a humidity sensor. The uplink data information may carry the information about these sensors associated with the terminal device.

Alternatively, the first downlink information may also be used to request the terminal device to send uplink data information to the second device. The uplink data may be pre-stored by the terminal device, or may be determined by the terminal device (for example, collected by the terminal device).

For example, in a warehousing scenario, the terminal device may be associated with a plurality of containers. In the terminal device, information about commodities in these containers may be collected in real time, for example, information such as a name, a type, dimensions, or a weight of a commodity. The uplink data information may carry information about the commodities in these containers that is collected by the terminal device.

For another example, in a scientific research scenario or an industrial production scenario, the terminal device may be associated with a plurality of sensors. In the terminal device, information about these sensors may be collected in real time, such as temperature information collected by a temperature sensor, humidity information collected by a humidity sensor, and weight information collected by a weight sensor. The uplink data information may carry the information about these sensors that is collected by the terminal device.

The first uplink information is used to indicate whether the terminal device properly receives downlink data information sent by the second device through the first device. For example, in a case in which the first downlink information includes downlink data information, the first uplink information may be used to indicate a demodulation result of the first downlink information. For example, the first uplink information may be an ACK, and is used to indicate that the terminal device successfully demodulates the first downlink information. Alternatively, the first uplink information may be a NACK, and is used to indicate that the terminal device fails to demodulate the first downlink information.

The first uplink information may include uplink data information. For example, in a case in which the first downlink information includes uplink data request information, the first downlink information may also be used to request the terminal device to send uplink data information to the second device.

Further, the first uplink information may further include the identity information of the first device and/or identity information of the terminal device. Correspondingly, in a case in which the first uplink information includes the identity information of the first device, the second device may determine that the first device sends a downlink signal to the terminal device. Correspondingly, the second device may determine a location range of the terminal device based on a location of the first device.

Before S720, the method 700 may further include step S760. Details are as follows.

S760: The terminal device modulates the first uplink information into the first uplink signal.

Optionally, the terminal device may modulate the first uplink information into the first uplink signal in one or more manners of amplitude modulation, frequency modulation, or phase modulation.

Optionally, the terminal device may carry the first downlink information in the first downlink signal through cyclic redundancy check CRC.

Optionally, the terminal device may carry the first downlink information in the first downlink signal through a preamble.

After S720, the method 700 may further include step S770. Details are as follows.

S770: The second device demodulates the first uplink signal to obtain the first uplink information.

Optionally, the second device may demodulate the first uplink signal to obtain the first uplink information in one or more manners of amplitude modulation, frequency modulation, or phase modulation.

Optionally, the second device may demodulate the first uplink signal to obtain the first uplink information through cyclic redundancy check CRC demodulation.

Optionally, the second device may demodulate the first uplink signal to obtain the first uplink information through preamble demodulation.

In this embodiment of this application, a terminal device receives a downlink signal from a first device, and sends an uplink signal to a second device. In this way, the terminal device respectively transmits a downlink signal and an uplink signal with different devices, so that overlapping between a transmission path of the downlink signal and a transmission path of the uplink signal may be avoided, and interference between the downlink signal and the uplink signal can be avoided.

The foregoing describes method embodiments of this application in detail with reference to FIG. 1 to FIG. 8. The following describes apparatus embodiments of this application in detail with reference to FIG. 9 and FIG. 12. It should be understood that the description of the method embodiments corresponds to the description of the apparatus embodiments, and therefore, for parts that are not described in detail, refer to the foregoing method embodiments.

Figure 9:
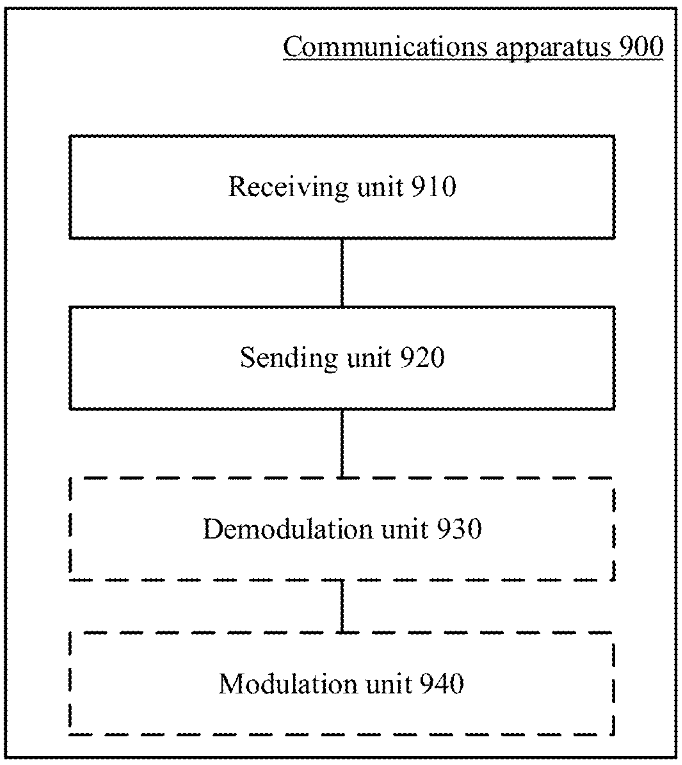
FIG. 9 is a schematic structural diagram of a communications apparatus according to an embodiment of this application.

FIG. 9 is a schematic structural diagram of a communications apparatus according to an embodiment of this application. As shown in FIG. 9, the apparatus 900 includes a receiving unit 910 and a sending unit 920. Details are as follows.

The receiving unit 910 is configured to receive a first downlink signal from a first device, where the apparatus is a zero-power terminal.

The sending unit 920 is configured to send a first uplink signal to a second device according to the first downlink signal.

Optionally, the first downlink signal carries first downlink information, and the first downlink information is used to trigger the apparatus to send an uplink signal. The apparatus 900 further includes a demodulation unit 930, configured to demodulate the first downlink signal to obtain the first downlink information after the first downlink signal from the first device is received.

Optionally, the first downlink information includes identity information of the first device.

Optionally, the first downlink information further includes downlink data information.

Optionally, the first downlink information further includes uplink data request information, and the uplink data request information is used to request the apparatus to send uplink data information.

Optionally, the demodulation unit 930 is specifically configured to demodulate the first downlink signal to obtain the first downlink information in one or more manners of amplitude modulation, frequency modulation, or phase modulation.

Optionally, the demodulation unit 930 is specifically configured to demodulate the first downlink signal to obtain the first downlink information through cyclic redundancy check CRC demodulation.

Optionally, the demodulation unit 930 is specifically configured to demodulate the first downlink signal to obtain the first downlink information through preamble demodulation.

Optionally, the first uplink signal carries first uplink information, and the first uplink information includes registration request information and/or uplink data information of the apparatus.

Optionally, the first uplink signal carries first uplink information, and the first uplink information is used to indicate whether the apparatus properly receives downlink data information sent by the second device through the first device.

Optionally, the first uplink signal carries first uplink information, and the first uplink information includes uplink data information.

Optionally, the first uplink information further includes identity information of the first device and/or identity information of the apparatus.

Optionally, the apparatus 900 further includes a modulation unit 940, configured to modulate the first uplink information into the first uplink signal in one or more manners of amplitude modulation, frequency modulation, or phase modulation before the first uplink signal is sent to the second device according to the first downlink signal.

Optionally, the apparatus 900 further includes a modulation unit 940, configured to carry the first downlink information in the first downlink signal through cyclic redundancy check CRC before the first uplink signal is sent to the second device according to the first downlink signal.

Optionally, the apparatus 900 further includes a modulation unit 940, configured to carry the first downlink information in the first downlink signal through a preamble before the first uplink signal is sent to the second device according to the first downlink signal.

Optionally, a frequency band of the first uplink signal is the same as or different from a frequency band of the first downlink signal.

Figure 10:
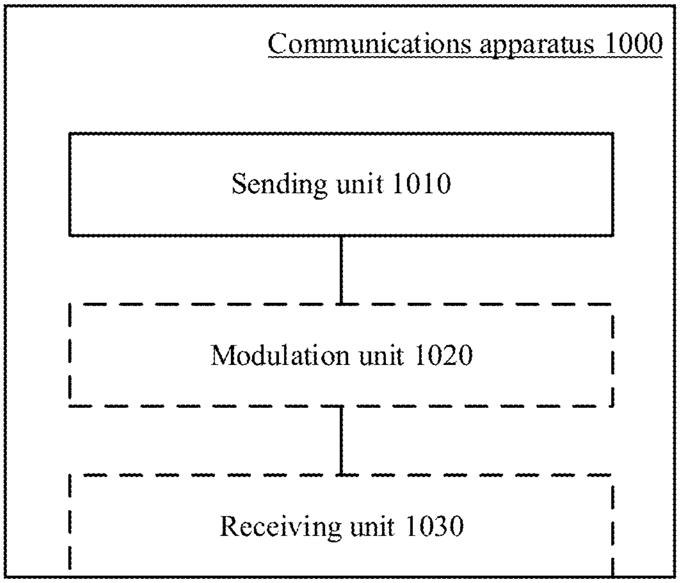
FIG. 10 is a schematic structural diagram of a communications apparatus according to another embodiment of this application.

FIG. 10 is a schematic structural diagram of a communications apparatus according to an embodiment of this application. The communications apparatus 1000 in FIG. 10 includes a sending unit 1010. Details are as follows.

The sending unit 1010 is configured to send a first downlink signal to a terminal device, where the terminal device is a zero-power terminal, and the first downlink signal is used to trigger the terminal device to send an uplink signal to a second device.

Optionally, the first downlink signal carries first downlink information, and the first downlink information is used to trigger the terminal device to send an uplink signal. The apparatus 1000 further includes a modulation unit 1020, configured to modulate the first downlink information into the first downlink signal before the first downlink signal is sent to the terminal device.

Optionally, the first downlink information includes identity information of the apparatus.

Optionally, the first downlink information further includes downlink data information.

Optionally, the first downlink information further includes uplink data request information, and the uplink data request information is used to request the terminal device to send uplink data information.

Optionally, the modulation unit 1020 is specifically configured to modulate the first downlink information into the first downlink signal in one or more manners of amplitude modulation, frequency modulation, or phase modulation.

Optionally, the modulation unit 1020 is specifically configured to carry the first downlink information in the first downlink signal through cyclic redundancy check CRC.

Optionally, the modulation unit 1020 is specifically configured to carry the first downlink information in the first downlink signal through a preamble.

Optionally, the apparatus 1000 further includes a receiving unit 1030, configured to receive second downlink information from the second device, where the first downlink signal is obtained according to the second downlink information.

Optionally, the apparatus 1000 further includes a receiving unit 1030, configured to receive third downlink information from the second device, where the third downlink information is used to configure an identity of the apparatus.

Optionally, the apparatus 1000 is connected to the second device in a wireless or wired manner.

Figure 11:
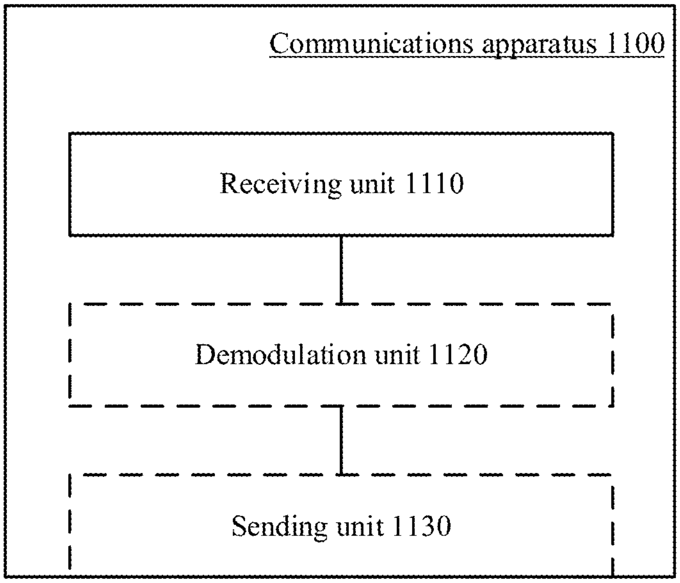
FIG. 11 is a schematic structural diagram of a communications apparatus according to still another embodiment of this application.

FIG. 11 is a schematic structural diagram of a communications apparatus according to an embodiment of this application. The communications apparatus 1100 in FIG. 11 includes a receiving unit 1110. Details are as follows.

The receiving unit 1110 is configured to receive a first uplink signal sent by a terminal device upon triggering of a first downlink signal, where the first downlink signal is from a first device, and the terminal device is a zero-power terminal.

Optionally, the first uplink signal carries first uplink information, and the first uplink information includes registration request information and/or uplink data information of the terminal device.

Optionally, the first uplink signal carries first uplink information, and the first uplink information is used to indicate whether the terminal device properly receives downlink data information sent by the apparatus through the first device.

Optionally, the first uplink signal carries first uplink information, and the first uplink information includes uplink data information.

Optionally, the first uplink information further includes identity information of the first device and/or identity information of the terminal device.

Optionally, the apparatus 1100 further includes a demodulation unit 1120, configured to demodulate the first uplink signal to obtain the first uplink information after the first uplink signal sent by the terminal device upon triggering of the first downlink signal is received.

Optionally, the demodulation unit 1120 is specifically configured to demodulate the first uplink signal to obtain the first uplink information in one or more manners of amplitude modulation, frequency modulation, or phase modulation.

Optionally, the demodulation unit 1120 is specifically configured to demodulate the first uplink signal to obtain the first uplink information through cyclic redundancy check CRC demodulation.

Optionally, the demodulation unit 1120 is specifically configured to demodulate the first uplink signal to obtain the first uplink information through preamble demodulation.

Optionally, the apparatus 1100 further includes a sending unit 1130, configured to send second downlink information to the first device, where the first downlink signal is obtained according to the second downlink information.

Optionally, the apparatus 1100 further includes a sending unit 1130, configured to send third downlink information to the first device, where the third downlink information is used to configure an identity of the first device.

Optionally, the first device is connected to the apparatus 1100 in a wireless or wired manner.

Optionally, a frequency band of the first uplink signal is the same as or different from a frequency band of the first downlink signal.

Figure 12:
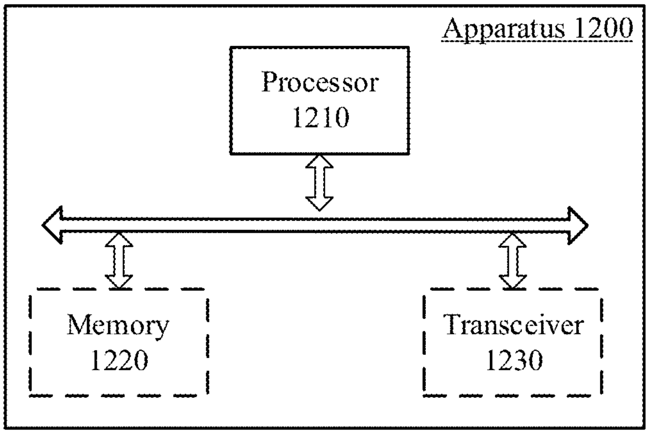
FIG. 12 is a schematic structural diagram of an apparatus according to an embodiment of this application.

FIG. 12 is a schematic structural diagram of an apparatus according to an embodiment of this application. The dashed lines in FIG. 12 indicate that the unit or module is optional. The apparatus 1200 may be configured to implement the methods described in the method embodiments. The apparatus 1200 may be a chip or a communications apparatus. Optionally, the apparatus 1200 may be a zero-power terminal.

The apparatus 1200 may include one or more processors 1210. The processor 1210 may allow the apparatus 1200 to implement the method described in the foregoing method embodiments. The processor 1210 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1200 may further include one or more memories 1220. The memory 1220 stores a program. The program may be executed by the processor 1210, to cause the processor 1210 to execute the methods described in the foregoing method embodiments. The memory 1220 may be independent of the processor 1210 or may be integrated into the processor 1210.

The apparatus 1200 may further include a transceiver 1230. The processor 1210 may communicate with another device or chip through the transceiver 1230. For example, the processor 1210 may send data to and receive data from another device or chip through the transceiver 1230. The transceiver 1230 may perform backscatter communication. For example, the transceiver 1230 may be implemented by a zero-power circuit.

The apparatus 1200 may further include an energy harvesting module, configured to harvest energy of a spatial electromagnetic wave, to provide energy for the apparatus 1200. For example, the transceiver 1230 receives an energy supply signal, and the energy harvesting module may harvest energy based on the energy supply signal, to drive a load circuit in the apparatus 1200.

An embodiment of this application further provides a computer-readable storage medium, configured to store a program. The computer-readable storage medium may be applied to a communications apparatus provided in embodiments of this application, and the program causes a computer to execute a method to be executed by the communications apparatus in various embodiments of this application.

An embodiment of this application further provides a computer program product. The computer program product includes a program. The computer program product may be applied to a communications apparatus provided in embodiments of this application, and the program causes a computer to execute the methods to be executed by the communications apparatus in various embodiments of this application.

An embodiment of this application further provides a computer program. The computer program may be applied to a communications apparatus provided in embodiments of this application, and the computer program causes a computer to execute the methods to be executed by the communications apparatus in various embodiments of this application.

It should be understood that, in embodiments of this application, "B that corresponds to A" means that B is associated with A, and B may be determined based on A. However, it should also be understood that, determining B based on A does not mean determining B based on only A, but instead, B may be determined based on A and/or other information.

It should be understood that, in this specification, the term "and/or" is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects before and after.

It should be understood that, in embodiments of this application, sequence numbers of the foregoing processes do not mean execution sequences. The execution sequences of the processes should be determined based on functions and internal logic of the processes, and should not be construed as any limitation on the implementation processes of embodiments of this application.

In several embodiments provided in this application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not executed. In addition, the displayed or discussed mutual couplings or direct couplings or communication connections may be implemented through some interfaces. The indirect couplings or communication connections between apparatuses or units may be implemented in electrical, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of embodiments.

In addition, functional units in embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

receiving, by a terminal device, a first downlink signal from a first device, wherein the terminal device is a zero-power terminal; and sending, by the terminal device, a first uplink signal to a second device according to the first downlink signal;

receiving, second downlink information from the second device, wherein the first downlink signal is obtained according to the second downlink information; and receiving, third downlink information from the second device, wherein the third downlink information is used to configure an identity of the first device.

2. The method according to claim 1, wherein the first downlink signal carries first downlink information, and the first downlink information is used to trigger the terminal device to send an uplink signal; and after the receiving, by the terminal device, a first downlink signal from a first device, the method further comprises:

demodulating, by the terminal device, the first downlink signal to obtain the first downlink information.

3. The method according to claim 2, wherein the first downlink information comprises identity information of the first device.

4. The method according to claim 3, wherein the first downlink information further comprises downlink data information; or uplink data request information, and the uplink data request information is used to request the terminal device to send uplink data information.

5. The method according to claim 2, wherein the demodulating, by the terminal device, the first downlink signal to obtain the first downlink information comprises:

demodulating, by the terminal device, the first downlink signal to obtain the first downlink information in one or more manners of amplitude modulation, frequency modulation, or phase modulation; or demodulating, by the terminal device, the first downlink signal to obtain the first downlink information through cyclic redundancy check (CRC) demodulation.

6. The method according to claim 2, wherein the first uplink signal carries first uplink information, and the first uplink information comprises registration request information and/or uplink data information of the terminal device; or the first uplink information is used to indicate whether the terminal device properly receives downlink data information sent by the second device through the first device; or the first uplink information comprises uplink data information.

7. The method according to claim 6, wherein the first uplink information further comprises identity information of the first device and/or identity information of the terminal device.

8. The method according to claim 6, wherein before the sending, by the terminal device, a first uplink signal to a second device according to the first downlink signal, the method further comprises:

modulating, by the terminal device, the first uplink information into the first uplink signal in one or more manners of amplitude modulation, frequency modulation, or phase modulation; or carrying, by the terminal device, the first uplink information in the first uplink signal through cyclic redundancy check (CRC); or carrying, by the terminal device, the first uplink information in the first uplink signal through a preamble.

9. A terminal device, comprising:

a processor and a memory, wherein the memory is configured to store a computer program, and the processor is configured to invoke and run the computer program stored in the memory to cause the terminal device to perform:

receiving, a first downlink signal from a first device, wherein the terminal device is a zero-power terminal; and sending, a first uplink signal to a second device according to the first downlink signal;

receiving, second downlink information from the second device, wherein the first downlink signal is obtained according to the second downlink information; and receiving, third downlink information from the second device, wherein the third downlink information is used to configure an identity of the first device.

10. The terminal device according to claim 9, wherein the first downlink signal carries first downlink information, and the first downlink information is used to trigger the terminal device to send an uplink signal; and after the receiving, a first downlink signal from a first device, the terminal device further comprises:

demodulating, the first downlink signal to obtain the first downlink information.

11. The terminal device according to claim 10, wherein the first downlink information comprises identity information of the first device.

12. The terminal device according to claim 10, wherein the demodulating, the first downlink signal to obtain the first downlink information comprises:

demodulating, the first downlink signal to obtain the first downlink information in one or more manners of amplitude modulation, frequency modulation, or phase modulation; or demodulating, the first downlink signal to obtain the first downlink information through cyclic redundancy check (CRC) demodulation.

13. The terminal device according to claim 10, wherein the first uplink signal carries first uplink information, and the first uplink information comprises registration request information and/or uplink data information of the terminal device; or the first uplink information is used to indicate whether the terminal device properly receives downlink data information sent by the second device through the first device;

or the first uplink information comprises uplink data information.

14. A communications apparatus, the communications apparatus is a first device, comprising:

a processor and a memory, wherein the memory is configured to store a computer program, and the processor is configured to invoke and run the computer program stored in the memory to cause the first device to perform:

sending, a first downlink signal to a terminal device, wherein the terminal device is a zero-power terminal, and the first downlink signal is used to trigger the terminal device to send an uplink signal to a second device;

receiving, second downlink information from the second device, wherein the first downlink signal is obtained according to the second downlink information; and receiving, third downlink information from the second device, wherein the third downlink information is used to configure an identity of the first device.

15. The apparatus according to claim 14, wherein the first downlink signal carries first downlink information, and the first downlink information is used to trigger the terminal device to send an uplink signal; and before the sending, a first downlink signal to a terminal device, the apparatus comprises:

modulating, the first downlink information into the first downlink signal.

16. The apparatus according to claim 15, wherein the first downlink information comprises identity information of the first device; or the first downlink information further comprises downlink data information; or uplink data request information, and the uplink data request information is used to request the terminal device to send uplink data information.

17. The apparatus according to claim 15, wherein the modulating, the first downlink information into the first downlink signal comprises:

modulating, the first downlink information into the first downlink signal in one or more manners of amplitude modulation, frequency modulation, or phase modulation; or carrying, the first downlink information in the first downlink signal through cyclic redundancy check (CRC); or carrying, the first downlink information in the first downlink signal through a preamble.

18. The apparatus according to claim 14, wherein the first device is connected to the second device in a wireless or wired manner.

* * * * *